United States Patent [19]

Doughty et al.

[11] Patent Number: 5,700,436
[45] Date of Patent: *Dec. 23, 1997

[54] PURIFICATION OF AIR IN ENCLOSED SPACES

[75] Inventors: David T. Doughty, Coraopolis; Richard A. Hayden, Pittsburgh; John W. Cobes, III, Harmony; Thomas M. Matviya, Pittsburgh, all of Pa.

[73] Assignee: Calgon Carbon Corporation, Pittsburgh, Pa.

[*] Notice: The term of this patent shall not extend beyond the expiration date of Pat. No. 5,352,370.

[21] Appl. No.: 252,699

[22] Filed: Jun. 2, 1994

Related U.S. Application Data

[63] Continuation-in-part of Ser. No. 008,722, Jan. 21, 1993, Pat. No. 5,352,370.

[51] Int. Cl.$^6$ .............................. B01D 39/20; C01B 17/00; C01B 17/16; C01B 21/00
[52] U.S. Cl. ........................ 423/210; 55/522; 95/116; 95/129; 95/136; 95/137; 95/143; 95/147; 423/230; 423/235; 423/244.01; 423/244.03; 423/245.1
[58] Field of Search ............................ 55/522; 423/210, 423/230, 235, 244.01, 244.03, 245.1; 95/116, 129, 136, 137, 143, 147

[56] References Cited

U.S. PATENT DOCUMENTS

| | | | |
|---|---|---|---|
| 2,423,702 | 7/1947 | Hart | 55/522 |
| 2,721,184 | 10/1955 | Voorhies | 55/522 |
| 3,006,346 | 10/1961 | Golding | 55/522 |
| 3,926,590 | 12/1975 | Aibe et al. | 423/244.03 |
| 5,015,451 | 5/1991 | Hölter et al. | 423/235 |
| 5,639,707 | 6/1997 | Lewis et al. | 95/143 |

FOREIGN PATENT DOCUMENTS

| | | | |
|---|---|---|---|
| 2911428 | 10/1980 | Germany | 55/522 |
| 58330 | 3/1989 | Japan | 423/239.1 |
| 58331 | 3/1989 | Japan | 423/239.1 |

OTHER PUBLICATIONS

J. Wang and W. Xie, "An Appraisal of the Surface Chemistry and the Catalytic Oxidative Activity of Nitrogen–Modified Activated Carbon by XPS", *Cuihua Xuebao* 10 (4), 357 (1989).

B. Stohr, H.P. Boehm, and R. Schlogl, "Enhancement of the Catalytic Activity of Activated Carbons in Oxidation Reactions by Thermal Treatment with Ammonia or Hydrogen Cyanide and observation of Superoxide Species as a Possible Intermediate", *Carbon* 29 (6), 707 (1991).

*Primary Examiner*—Wayne Langel
*Attorney, Agent, or Firm*—Titus & McConomy

[57] ABSTRACT

The present invention discloses an improved method for filtration of air within enclosed spaces. Improvement is achieved by the use of a high-temperature carbonaceous char that is catalytically active for the removal of certain undesirable constituents from contaminated air under ambient temperature conditions. This carbonaceous char is used as an air filtration medium and incorporated into an air filtration device by any of a number of technologies. Such devices may be used for removal of contaminants such as $NO_x$, $NO_2$, $SO_x$, $SO_2$, $H_2S$, mercaptans, light aliphatic gases such as butane and propane and other compounds such as benzene, hexane, toluene, xylene, amines and the like from enclosed or confined structures such as buildings or vehicles including automobiles, aircraft, trucks, farm equipment, and the like.

8 Claims, No Drawings

PURIFICATION OF AIR IN ENCLOSED SPACES

CROSS-REFERENCE

This is a continuation-in-part application of Ser. No. 08/008,722 filed Jan. 21, 1993, U.S. Pat. No. 5,352,370, entitled Method for $SO_x$ Removal by Catalytic Carbon.

FIELD OF THE INVENTION

The present invention relates to an air filtration method which uses a catalytically-active high-temperature char for the removal of undesirable contaminants from ambient air. The invention may be used for air purification within enclosed or confined structures such as buildings or vehicles including automobiles, aircraft, trucks, farm equipment, and the like.

BACKGROUND OF THE INVENTION

Activated carbon has been used for many years in air filtration and purification systems. In these systems, activated carbon functions as a filter medium. The carbon filter consists of activated carbon tightly packed within a container, agglomerated within a form by use of any of a number of binders, or otherwise extruded or formed to provide a self-supporting unit. In this filter medium, the activated carbon provides for physical adsorption of undesirable contaminants from ambient or tempered air. Physical adsorption is the adherence of the atoms, ions, or molecules of a gas or liquid to the surface of another substance. In the process, the adsorbed substance is not altered chemically. Some contaminants, however are not adequately removed by physical adsorption using conventional activated carbons under the conditions of the application. Many of these contaminants can be removed by the addition of various materials to the activated carbon to provide chemical reaction capabilities not normally possessed by the carbon alone. In these instances, the activated carbon functions largely as an inert support for the added materials. These added materials may provide for catalytic reaction or may react directly with the contaminant of concern. Examples would include the addition of Pt or Pd to activated carbon to catalyze various oxidation reactions, or the addition of metal salts such as copper oxide to react directly with contaminants such as hydrogen chloride or hydrogen sulfide. It has been found that the addition of certain halogens and/or transition metal impregnants to carbon substrates also enhance the removal of hydrogen sulfide and mercaptans from humid air streams. In these cases, the activated carbon substrate does not generally participate in the chemical reaction itself.

In many instances, however, the material added to the activated carbon to provide the chemical reaction capabilities may occupy adsorption space which might otherwise be available for physical adsorption of other contaminants. As a result, the performance of the activated carbon for removal of physically adsorbed contaminants may be diminished. Optimal performance of the activated carbon or filter medium for removal of a range of contaminants is then represented by a balance between the carbon's inherent physical adsorption capabilities and the chemical reactivity of the added material(s). Furthermore, the use of such additives may present secondary concerns. Many of these additives are metal compounds or salts, which may present environmentally-related disposal concerns.

None of the improvements suggested thus far, however, have attempted to alter the inherent properties of a carbon such that chemical conversion and removal of the contaminant is accomplished by the carbon alone. The use of carbons prepared by treatment with nitrogen-containing compounds or prepared from nitrogen-rich starting materials has shown some promise in this regard. For example, the production of a carbon suitable for catalytic sulfur dioxide oxidation has been described wherein a high-temperature activated carbon or coke is oxidized and exposed to a nitrogen-containing ammonium salt at temperatures above 350° C.

Nevertheless, the prior art processes for preparing carbons which are catalytically active per se have certain disadvantages which limit their overall utility and practicality in air filtration and purification systems. For example, some use nitrogen-rich starting materials such as polyacrylonitrile or polyamide. These materials are expensive and have been found to generate large amounts of cyanide and other toxic gases upon carbonization. Those which use chars derived from nitrogen-poor starting materials invariably require high-temperature chars which necessitate further processing. Since such materials are relatively inert chemically, the use of extensive and aggressive chemical post-treatments is usually required to effect significant changes in their catalytic capabilities. The use of high-temperature chars is, therefore, inevitably more expensive than the direct use of the raw materials from which they are derived. Additionally, such processes entail the use of large amounts of toxic and/or hazardous reagents such as nitric acid, sulfuric acid, ammonia, or toluene diisocyanate, and the generation of significant amounts of toxic and/or hazardous byproducts such as sulfur dioxide, nitric oxide, and cyanide in their production.

Accordingly, it is the object of the present invention to provide a carbonaceous char which provides enhanced chemical reaction capabilities. These capabilities are incorporated without corresponding losses in the physical adsorption capabilities of the carbon, or the addition of metal compounds or salts.

Furthermore, it is an object of the present invention to provide an effective, low cost, method for air filtration and purification using a carbonaceous char prepared directly from an inexpensive and abundant bituminous coal or a carbonaceous material having bituminous properties.

It is a further object of the present invention to provide an air purification method utilizing a high temperature carbonaceous char which has been found to be useful in ambient temperature air filtration systems. Said char provides chemical reaction capabilities, while at the same time providing a high adsorption micropore volume at a given carbon density.

Another objective of the invention is to remove impurities from air within an enclosed or confined space, especially air found within the passenger compartment of an automobile, by using carbons that function as catalysts for a number of reactions, including the removal of sulfides, sulfur dioxide, nitric oxide, $NO_2$, $NO_x$, $SO_x$ and $H_2S$. Impurities to be removed will include those typically encountered in the vicinity of urban and/or rural highways. Finally, it is an objective of the invention to provide an effective air purification system for use within confined spaces, said system having a long useful life and requiring only a small volume of space.

SUMMARY OF THE INVENTION

The present invention provides a method for improved purification of air within enclosed environments. This method is particularly useful for purifying air in vehicle passenger compartments such as in automobiles, trucks, or aircraft, and in buildings and other confined spaces. The method includes passing air contaminated with undesired components through a catalytically-active high-temperature carbonaceous char. The char has been specially treated during preparation to simultaneously provide adequate physical adsorption properties and sufficient catalytic activity to accomplish removal of a broad range of contaminants from air. The contaminants removed include $NO_x$, $NO_2$, $SO_x$, $SO_2$, $H_2S$, mercaptans, light aliphatic gases such as butane and propane and other compounds such as benzene, hexane, toluene, xylene, amines and the like. The carbonaceous chars used in the present invention preferably possess a high adsorption capacity for the contaminants of interest or such other attributes which make them useful in the removal of various impurities from air.

In the preferred embodiment of the invention, carbons used in the method are prepared directly from an inexpensive and abundant nitrogen-poor feedstock such as bituminous coal or a carbonaceous material having, or processed to have, bituminous properties such as those derived from higher or lower rank coals and ligno-cellulose materials by various chemical treatments (hereinafter collectively referred to as "bituminous material"). Examples of higher rank coals include anthracite and semi-anthracite coals while examples of lower rank coals include peat, lignite, and sub-bituminous coal. Examples of the chemical treatment of these materials include alkali metal treatment of the high rank materials and zinc chloride or phosphoric acid treatment of the low rank materials. These types of treatments can also be applied to ligno-cellulose materials to convert them into materials having bituminous properties.

In the preferred embodiment of the invention, carbons used in the method are prepared from a feedstock material which is pulverized, mixed if necessary with a small amount of a suitable binder such as pitch, briquetted or otherwise formed, and sized. The sized material is then extensively oxidized at temperatures less than 700° C., preferably less than 400° C. The oxidation is preferably continued until additional gains in the catalytic activity of the final product are no longer evident; that is, the oxidation is well beyond that known to those skilled in the art to be required to remove the coking properties of bituminous coals. This extended oxidation process produces an optimally oxidized low-temperature carbonaceous char.

The oxidized low-temperature char is then exposed to a nitrogen-containing compound such as urea or other nitrogen-containing compound having at least one nitrogen-containing functionality in which the nitrogen exhibits a formal oxidation number less than that of elemental nitrogen. This treatment is carded out by heating the low-temperature oxidized char to high temperatures, preferably between 850° C. and 950° C., in the presence of the nitrogen-containing compound. This heating is preferably conducted under an atmosphere that is inert except for the gases and vapors attributable to the char and/or the nitrogen-containing compound. The heating rate and temperatures are selected such that additional gains in the catalytic activity of the final product are no longer evident.

The nitrogen-compound-treated, high-temperature char may then be further calcined and/or activated to the desired density and yield at temperatures above 700° C., preferably above 900° C., in steam and/or carbon dioxide, with or without the addition of other gasifying agents such as air. The calcined or calcined/activated char is then cooled in an oxygen-free or otherwise inert atmosphere to temperatures less than 400° C., preferably less than 100° C. Additional gains in catalytic activity may be realized by repeating the oxidation, exposure to nitrogen-containing compounds, calcination or calcination/activation, and inert cooling as many times as may be desired. Alternatively, any other method known to generate catalytic activity in high temperature chars may be applied to the resultant product to further enhance its catalytic activity.

In the present invention, the catalytic carbonaceous char can be prepared as pellets, granules, powders, or other shapes of various sizes using methods known to those skilled in the art. These various forms of the catalytic carbonaceous char may then be incorporated into any of a number of filter element types using known technologies. Alternatively, the catalytically-active char may be formed into an integrated filter pack using any of a number of binding or agglomeration technologies known to be effective for this purpose. See for example PCT WO 94/03270. The size of the filter and structure, and the magnitude of the air velocities and pressure drops and other associated variables are all dependent upon the specific conditions of the application.

The method of the present invention has been found to be very effective in removing various impurities at or near ambient temperatures using these catalytically-active carbonaceous chars. Other advantages of the present invention will be apparent from a perusal of the following examples which show preferred embodiments of the invention.

PRESENTLY PREFERRED EMBODIMENTS

The following examples illustrate the present invention. Example 1 illustrates preparation of a conventional activated carbon by prior art methods while Examples 10 and 13 illustrate the removal of contaminants by prior art methods. Examples 2–9 illustrate various methods for preparing carbonaceous chars having utility in the present invention. Examples 11–14 illustrate the improved performance for removal of reactive contaminants which can be obtained by means of the present invention. Example 12 demonstrates the chemical reaction properties of the char of the present invention. Example 15 is directed to improvements obtained in the particular application of automotive passenger compartment air purification.

EXAMPLE 1 (PRIOR ART)

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized material was cooled in a low oxygen content atmosphere. A portion of the oxidized low temperature char was rapidly heated to 950° C. under an inert gas atmosphere and maintained at that temperature for 1 hour. Immediately following this treatment the material was contacted with steam, while maintaining a 950° C. temperature, for a sufficient period of time to result in gasification sufficient to achieve an Apparent Density (Test Method TM-7, Calgon Carbon Corporation, Pittsburgh Pa.) of 0.448 grams per cc. After gasification, the material was cooled to ambient temperature under an inert atmosphere.

EXAMPLE 2

A bituminous coal was pulverized, mixed with 6% coal tar pitch, and briquetted. The resultant briquettes were crushed and sized to produce an approximately less than 6 mesh size and greater than 16 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4.5 hours, and finally heated from 350° C. to 450° C. at a rate of 100° C. per hour. The resultant oxidized material was cooled in a low oxygen content atmosphere and subsequently impregnated with an aqueous urea solution and dried. The quantity of solution of urea used was sufficient to produce a 4% urea loading on a dry weight basis. After impregnation, portions of the oxidized, impregnated low temperature char were rapidly heated to 900° C. under an inert gas atmosphere and maintained at that temperature for 1 hour. Immediately following this treatment the portions of the resultant material were activated with steam for various time periods. After activation, the materials were cooled to ambient temperature under an inert atmosphere. Three of the activated carbons so produced, when sized to less than 6 mesh (U.S. Standard Series) and greater than 16 mesh (U.S. Standard Series) exhibited Apparent Densities (Test Method TM-7, Calgon Carbon Corporation, Pittsburgh Pa.) of 0.589 grams per cc, 0.558 grams per cc, and 0.524 grams per cc.

EXAMPLE 3

Bituminous coal was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, held at 325° C. for 5 hours, and finally heated from 325° C. to 450° C. at a rate of 125° C. per hour. The resultant oxidized material was cooled in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low temperature char was rapidly heated to 950° C. under an inert gas atmosphere and maintained at that temperature for 1 hour. Immediately following this treatment the resultant material was activated with steam. Following activation, the material was cooled to ambient temperature under an inert gas atmosphere. The activated carbon so produced, when sized to less than 4 mesh (U.S. Standard Series) and greater than 6 mesh (U.S. Standard Series) exhibited an Apparent Density (Test Method TM-7, Calgon Carbon Corporation, Pittsburgh Pa.) of 0.519 grams per cc.

EXAMPLE 4

Bituminous coal as used in Example 2 was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 5 hours, and finally heated from 350° C. to 450° C. at a rate of 100° C. per hour. The resultant oxidized material was cooled in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low temperature char was rapidly heated to 950° C. under an inert gas atmosphere and maintained at that temperature for 1 hour. Immediately following this treatment the resultant material was activated with steam. Following activation, the material was cooled to ambient temperature under an inert gas atmosphere. The activated carbon so produced, when sized to less than 4 mesh (U.S. Standard Series) and greater than 6 mesh (U.S. Standard Series) exhibited an Apparent Density (Test Method TM-7, Calgon Carbon Corporation, Pittsburgh Pa.) of 0.495 grams per cc.

EXAMPLE 5

Bituminous coal as used in Example 2 was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 4 hours, and finally heated from 350° C. to 450° C. at a rate of 100° C. per hour. The resultant oxidized material was cooled in a low oxygen content atmosphere and subsequently impregnated with an aqueous urea solution and dried. The quantity of urea solution used was sufficient to produce a 4% urea loading on a dry weight basis. After impregnation, a portion of the oxidized, impregnated low temperature char was rapidly heated to 950° C. under an inert gas atmosphere and maintained at that temperature for 1 hour. Immediately following this treatment the resultant material was activated with steam. The material was then cooled to ambient temperature under an inert gas atmosphere. The activated carbon so produced, when sized to less than 4 mesh (U.S. Standard Series) and greater than 6 mesh (U.S. Standard Series) exhibited an Apparent Density (Test Method TM-7, Calgon Carbon Corporation, Pittsburgh Pa.) of 0.571 grams per cc.

EXAMPLE 6

A bituminous coal was pulverized with about 6% coal tar pitch. This pulverized material was then intimately blended with 10% powdered corn starch. After blending, 20% water was added to the resultant mixture. This wet mix was then extruded using a ring-die pelletizer to produce pellets of approximately 4 mm diameter. The resultant pellets were then dried and screened to remove fines. In the presence of large quantifies of excess air, these pellets were oxidized by heating from 100° C. to 200° C. at a rate of 200° C. per hour, then from 200° C. to 350° C. at a rate of 100° C. per hour, held at 350° C. for 4.5 hours, and finally heated from 350° C. to 450° C. at a rate of 100° C. per hour. The resultant oxidized material was cooled in a low oxygen content atmosphere and subsequently impregnated with an aqueous urea solution and dried. The quantity of urea solution used was sufficient to produce a 4% urea loading on a dry weight basis. After impregnation, a portion of this oxidized, impregnated low temperature char was rapidly heated to 900° C. under an inert gas atmosphere and maintained at that temperature for 1 hour. Immediately following this treatment the resultant material was activated with steam. Following activation, the material was cooled to ambient temperature under an inert gas atmosphere. The activated carbon pellets so produced were approximately 4 mm in diameter and exhibited an Apparent Density (Test Method TM-7, Calgon Carbon Corporation, Pittsburgh Pa.) of 0.420 grams per cc.

EXAMPLE 7

Bituminous coal as used in Example 2 was pulverized with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, held at 350° C. for 4 hours, and finally heated from 350° C. to 450° C. at a rate of 100° C. per hour. The resultant oxidized material was cooled in a low oxygen content inert atmosphere and subsequently impregnated with an aqueous urea solution and dried. The quantity of urea solution used was sufficient to produce a 4% urea loading on a dry weight basis. After impregnation, a portion of the oxidized, impregnated low temperature char was rapidly heated to 950° C. under an inert gas atmosphere and maintained at that temperature for 1 hour. Immediately following this treatment the resultant material was activated with steam for approximately 15 minutes. Following activation, this material was cooled to ambient temperatures under an inert atmosphere. This slightly activated carbon was then heated to 425° C. and maintained at that temperature for 90 minutes in the presence of excess air. The slightly activated carbon that resulted from this treatment was cooled in a low oxygen content atmosphere and subsequently impregnated with an aqueous urea solution and dried. The quantity of urea solution used was sufficient to produce a 4% urea loading on a dry weight basis. After impregnation, a portion of the impregnated mildly activated carbon was rapidly heated to 950° C. under an inert gas atmosphere and maintained at that temperature for 1 hour. Immediately following this treatment the resultant material was activated with steam. Following this activation the material was cooled to ambient temperature under an inert gas atmosphere. The activated carbon so produced, when sized to less than 4 mesh (U.S. Standard Series) and greater than 6 mesh (U.S. Standard Series) exhibited an Apparent Density (Test Method TM-7, Calgon Carbon Corporation, Pittsburgh Pa.) of 0.575 grams per cc

EXAMPLE 8

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 325° C. at a rate of 83° C. per hour, then held at 325° C. for 1 hour, and finally heated from 325° C. to 450° C. at a rate of 125° C. per hour. The resultant oxidized material was cooled in a low oxygen content atmosphere and subsequently impregnated with an aqueous urea solution and dried. The quantity of urea solution used was sufficient to produce a 2% urea loading on a dry weight basis. After impregnation, a portion of the oxidized, impregnated low temperature char was rapidly heated to 950° C. under an inert gas atmosphere and maintained at that temperature for 1 hour. Immediately following this treatment the material was contacted with steam, while maintaining a 950° C. temperature, for a sufficient period of time to result in gasification sufficient to achieve an Apparent Density (Test Method TM-7, Calgon Carbon Corporation, Pittsburgh Pa.) of 0.455 grams per cc. After gasification, the material was cooled to ambient temperature under an inert atmosphere.

EXAMPLE 9

Bituminous coal was pulverized, mixed with about 4% to 6% coal tar pitch, and briquetted. The resultant bfiquettes were crushed and sized to produce an approximately less than 4 mesh and greater than 10 mesh (U.S. Standard Series sieves) material. In the presence of large quantifies of excess air, this material was carbonized and oxidized at temperatures between about 300° C. and 400° C. for at least 3 hours. The resultant oxidized char was cooled to near ambient temperatures and subsequently impregnated with an aqueous urea solution and dried. The quantity of urea solution used was sufficient to produce a 2-4% urea loading on a dry weight basis. After impregnation, the impregnated oxidized char was rapidly heated to about 950° C. in a furnace and maintained at that temperature for approximately 1 hour. Immediately following this treatment the material was contacted with steam, while maintaining a 950° C. temperature, for a period of time sufficient to achieve an Apparent Density (Test Method TM-7, Calgon Carbon Corporation, Pittsburgh, Pa.) of about 0.51 grams per cc (g/cc) in material sized to 4×6 mesh (U.S. Standard Series sieves). After gasification, the material was cooled to ambient temperature under an inert atmosphere. The material was subsequently mildly crushed and resized to 20×50 mesh size (U.S. Standard Sieve). The Apparent Density (Test Method TM-7 Calgon Carbon Corporation, Pittsburgh, Pa.) was 0.564 grams/cc.

$H_2S$ REMOVAL (PRIOR ART)

EXAMPLE 10

A commercially available activated carbon, BPL (manufactured by Calgon Carbon Corporation, Pittsburgh Pa.) was sized to less than 5 and greater than 6 mesh (U.S. Standard Series sieves). When so sized this carbon showed an Apparent Density (Test Method TM-7, Calgon Carbon Corporation, Pittsburgh Pa.) of 0.504 grams per cc and a CCl4 Number (Test Method TM-6, Calgon Carbon Corporation, Pittsburgh Pa.) of 55.1%. The sized carbon was loaded into a column having an inside diameter of approximately 0.73 inches to give a bed depth of 9 inches. Column loading was done in such a manner as to achieve a packing density equivalent to the Apparent Density. A gas stream having a relative humidity of greater than 50%, an oxygen content of greater than 17 v/v %, and a known $H_2S$ concentration of approximately 1 v/v% was passed through this column at a flow rate of 1450+20 cc/minute under ambient conditions. The effluent from this column was monitored and the elapsed time required to achieve a 50 ppm $H_2S$ breakthrough was measured. For this carbon sample the elapsed time period was equal to 9 minutes.

$H_2S$ REMOVAL (PRESENT INVENTION)

EXAMPLE 11

Bituminous coal was pulverized, mixed with about 4 to 6% coal tar pitch, and briquetted. The resultant briquettes were crushed and sized to produce an approximately less than 4 mesh size and greater than i0 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 4 hours, and finally heated from 350° C. to 450° C. at a rate of 100° C. per hour. The resultant oxidized material was cooled in a low oxygen content atmosphere, sized to produce an approximately less than 5 and greater than 6 mesh size (U.S. Standard Series sieves) material, and subsequently impregnated with an aqueous urea solution and dried. The quantity of urea solution used was sufficient to produce a 4% urea loading on a dry weight basis. After impregnation, portions of the oxidized, impregnated low temperature char were rapidly heated to 950° C. under an inert gas atmosphere. Immediately following this treatment the resultant materials were activated with steam at 950° C. for a sufficient period of time to achieve the desired yield. After activation, the materials were cooled to ambient temperature under an inert atmosphere. The catalytically active activated carbon chars so produced, when combined and sized to less than 5 mesh (U.S. Standard Series) and greater than 6 mesh (U.S. Standard Series) exhibited an Apparent Density (Test Method TM-7, Calgon Carbon Corporation, Pittsburgh Pa.) of 0.495 grams per co.

The $H_2S$ removal ability of the sized, catalytically active, activated high temperature carbonaceous char prepared as described above was determined using conditions identical to those described in Example 10. For this sample of catalytically active activated carbon char the elapsed time period required to achieve a 50 ppm $H_2S$ breakthrough was equal to 326 minutes.

EXAMPLE 12

A sample of a nitrogen-treated carbon prepared as described in Example 9 was exposed to hydrogen sulfide in a humid air stream according to the following conditions:

A nine-inch deep, 22 mm diameter, bed of the carbon was contacted with an air stream containing 1.0 vol % of hydrogen sulfide at about 80% relative humidity and at ambient temperature and pressure. The total flowrate of the gas stream contacting the carbon was about 1450 mL per minute. The column effluent was monitored until breakthrough of hydrogen sulfide to 50 parts-per-million by volume was observed. The elapsed time required to achieve this breakthrough is called the hydrogen sulfide breakthrough time. The hydrogen sulfide breakthrough capacity is then calculated by multiplying the breakthrough time by the mass flowrate of hydrogen sulfide per unit volume.

By this procedure the nitrogen-treated carbon prepared as described in Example 9 displayed a hydrogen sulfide breakthrough time of 450 minutes. The corresponding hydrogen sulfide breakthrough capacity was 0.11 grams of hydrogen sulfide per cc of carbon (g $H_2S$/cc).

To determine the means by which the hydrogen sulfide was removed by the carbon, the spent carbon was analyzed after the above described hydrogen sulfide breakthrough had been achieved. The analyses were performed by extracting a representative sample of the spent carbon with deionized water in a Soxhlet apparatus and titrating an aliquot of the water extract with standard base to determine the amount of sulfuric acid on the carbon. The extracted carbon sample was then dried in situ at 110° C. and extracted a second time with carbon disulfide in a Soxhlet apparatus. The carbon disulfide in the extract was then evaporated and the weight of the extracted elemental sulfur was determined gravimetrically.

By this procedure, the spent nitrogen-treated carbon was found to contain 215 milligrams of sulfuric acid and 79 milligrams of elemental sulfur per gram of dry carbon. Therefore, at least 70% of the hydrogen sulfide removed by the carbon was converted on the surface of the carbon to sulfur species other than hydrogen sulfide.

$SO_2$ REMOVAL (PRIOR ART)

EXAMPLE 13

A commercially available activated carbon, BPL (manufactured by Calgon Carbon Corporation, Pittsburgh Pa.) was crushed and sized to less than 14 mesh and greater than 20 mesh. The sized carbon was placed into a column having an inside diameter of 18 mm to a bed depth of 76 mm. At ambient pressure and temperature, a humidified gas stream was passed through this column at a flow rate of 1000 cc per minute. The composition of the gas stream on a dry basis was nominally 500 ppmv $SO_2$ and 500 ppmv $O_2$ with the balance as $N_2$. This dry stream was humidified to between 50% and 80% relative humidity prior to its introduction into the carbon containing column. The column effluent was monitored and the elapsed time required to achieve a 10 to 15 ppmv $SO_2$ breakthrough determined. This sample of commercially available activated carbon achieved breakthrough in approximately 4 hours.

$SO_2$ REMOVAL (PRESENT INVENTION)

EXAMPLE 14

Bituminous coat was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 5 hours, and finally heated from 350° C. to 450° C. at a rate of 100° C. per hour. The resultant oxidized material was cooled in a low oxygen content atmosphere, sized to produce an approximately less than 4 and greater than 6 mesh size (U.S. Standard Series sieves) material, and subsequently impregnated with an aqueous urea solution and dried. The quantity of urea solution used was sufficient to produce a 4% urea loading on a dry weight basis. After impregnation, a portion of the oxidized, impregnated low temperature char was rapidly heated to 950° C. under an inert gas atmosphere and maintained at that temperature for 1 hour. Immediately following this treatment the resultant material was activated with steam at 950° C. After activation, the material was cooled to ambient temperature under an inert atmosphere. The catalytically active activated carbon char so produced, when sized to less than 4 mesh (U.S. Standard Series) and greater than 6 mesh (U.S. Standard Series) exhibited an Apparent Density (Test Method TM-7, Calgon Carbon Corporation, Pittsburgh Pa.) of 0.480 grams per cc.

The catalytically active activated carbon char prepared as described above was crushed and a less than 14 mesh and greater than 20 mesh size portion of this sample was evaluated for $SO_2$ removal in a manner identical to that described in Example 13. The column effluent was monitored and the elapsed time required to achieve a 10 to 15 ppmv breakthrough determined. This sample of catalytically active activated carbon char achieved breakthrough in approximately 15 hours.

EXAMPLE 15

A series of tests were conducted following the test procedures established to measure the effectiveness of various materials in removing vapors from automobile passenger compartments. The results of these tests are set forth in Tables I and II below. The test conditions compared a conventional commercially available coal-based activated carbon, Type OL (manufactured by Calgon Carbon Corp., Pittsburgh, Pa.) and a catalytic carbon (CC) of this invention, prepared as set forth in Example 9.

Tests were conducted by packing the volume of carbon indicated in Tables 1 and 2 into a 58 mm i.d. tube, and contacting the carbon sample with an air stream at 23°–±2° C. and 50% RH containing the particular test contaminant at the indicated concentration and linear velocity (0.095 m/sec.). The effluent stream was then analyzed to determine the concentration of the test contaminant. In the case of toluene and butane, the elapsed time (breakthrough time) at which contaminant concentration in the effluent reached a predetermined fraction of the influent (20% for toluene, or 30% for butane) was noted. For tests involving $SO_2$, and $H_2S$, the concentration of the test contaminant in the effluent stream at 5 minutes elapsed time was noted. Tests involving $NO_2$ (Table 2) were similarly monitored at 10 and 50 minutes. In addition, the concentration of NO, a known reaction product, was monitored in association with the $NO_2$ tests.

TABLE 1

Comparison of Effectiveness of a Prior Art Material (OL) to the Present Invention (CC) for Removal of Various Contaminants

| Contaminant | Influent Concentration | Carbon Type and Volume | Elapsed Time | % Breakthrough |
|---|---|---|---|---|
| Toluene | 80 ppm | OL (3 ml) | 36.1 min | 20.0 |
|  |  | CC (3 ml) | 52.7 min | 20.0 |
| Butane | 80 ppm | OL (3 ml) | 6.3 min | 30.0 |
|  |  | CC (3 ml) | 7.2 min | 30.0 |
| $SO_2$ | 30 ppm | OL (3 ml) | 5.0 min | 35.0 |
|  |  | CC (3 ml) | 5.0 min | 16.7 |
| $H_2S$ | 80 ppm | OL (3 ml) | 5.0 min | 91.0 |
|  |  | CC (3 ml) | 5.0 min | 77.3 |
|  |  | OL (6 ml) | 5.0 min | 74.8 |
|  |  | CC (6 ml) | 5.0 min | 40.0 |

The test conditions were as follows:
0.095 m/s linear velocity
50% RH
23 ± 2° C.

TABLE 2

Comparison of Effectiveness of a Prior Art Material (OL) to the Present Invention (CC) for Removal of Nitrogen Dioxide.

| Contaminant | Influent Concentration | Carbon Type and Volume | $NO_2$ Effluent @ 10 min | $NO_2$ Effluent @ 50 min | NO Effluent @ 10 min | NO Effluent @ 50 min |
|---|---|---|---|---|---|---|
| $NO_2$ | 10 ppm | OL (3 ml) | 1.8 ppm | 3.4 ppm | 0.9 ppm | 1.6 ppm |
|  |  | CC (3 ml) | 0.8 ppm | 1.4 ppm | 0.5 ppm | 0.8 ppm |
|  |  | OL (6 ml) | 0.2 ppm | 0.5 ppm | 0.7 ppm | 1.4 ppm |
|  |  | CC (6 ml) | 0.1 ppm | 0.1 ppm | 0.4 ppm | 0.7 ppm |

The test conditions were as follows:
0.095 m/s linear velocity
50% RH
23 ± 2° C.

The results of the $SO_2$, $H_2S$, and $NO_2$ testing show that the carbonaceous chars of the present invention provide significantly lower breakthrough concentrations at the indicated times than the comparison prior art material. The toluene and butane test results show that the breakthrough times obtained using the catalytic char of the present invention are equal or superior to those obtained using conventional activated carbons. The present invention thus provides for enhanced air purification performance in enclosed spaces such as within automobile passenger compartments.

While presently preferred embodiments of the invention have been described in particularity, the invention may be otherwise embodied within the scope of the appended claims.

What is claimed:

1. A method for removing various impurities from contaminated air within confined spaces, said method comprising passing said air through a filtration media comprising a carbonaceous char, said char being prepared by:
   a) carbonizing a bituminous material at temperatures below 700° C. in the presence of an oxidant;
   b) oxidizing said bituminous material at temperatures below 700° C. during or after said carbonization;
   c) contacting said carbonized and oxidized bituminous material at temperatures less than 700° C. with a nitrogen-containing compound, said nitrogen-containing compound being selected from the group consisting of urea and nitrogen containing compounds having at least one nitrogen functionality in which the nitrogen exhibits a formal oxidation number less than that of elemental nitrogen, and during or after said contacting, increasing the temperature to at least 700° C.; and
   d) activating said carbonaceous char contacted with said nitrogen-containing compound using any one of $H_2O$ or $CO_2$, or combinations thereof, with or without the addition of air, at temperatures above 700° C.

2. A method as set forth in claim 1 wherein a portion of said air passed through said filtration media is circulated therethrough at least a second time.

3. A method as set forth in claim 1 wherein said impurities are selected from a group consisting of $NO_x$, $NO_2$, $SO_x$, $SO_2$, $H_2S$, toluene, hexane, butane, propane, benzene, and xylene.

4. A method as set forth in claim 1 wherein said confined space is the passenger compartment of a vehicle.

5. A method as set forth in claim 1 including the step of maintaining said filtration media at or near ambient temperature.

6. A filter for removing various impurities from contaminated air within confined spaces, said filter having incorporated therein a filtration media comprising a carbonaceous char, said char being prepared by:
   a) carbonizing a bituminous material at temperatures below 700° C. in the presence of an oxidant;
   b) oxidizing said bituminous material at temperatures below 700° C. during or after said carbonization;

c) contacting said carbonized and oxidized bituminous material at temperatures less than 700° C. with a nitrogen-containing compound, said nitrogen-containing compound being selected from the group comprised of ammonia, urea, melamine, or any derivative thereof having at least one nitrogen functionality in which the nitrogen exhibits a formal oxidation number less than that of elemental nitrogen, and during or after said contacting, increasing the temperature to at least 700° C. and d) activating said carbonaceous char contacted with said nitrogen-containing compound with any one of $H_2O$, $CO_2$, $O_2$ or combinations thereof at temperatures above 700° C.

7. A filter as set forth in claim 6 wherein said carbonaceous char is granular, pelleted, extruded, shaped, formed, or powdered.

8. A filter as set forth in claim 6 wherein said carbonaceous char is made into a self-supporting unit by any of binding, molding, extrusion or agglomeration.

* * * * *